United States Patent
Gordon et al.

(10) Patent No.: US 6,754,700 B1
(45) Date of Patent: Jun. 22, 2004

(54) METHOD AND APPARATUS FOR MONITORING AND ADJUSTING BANDWIDTH USAGE IN A BROWSER

(75) Inventors: Robert B. Gordon, Austin, TX (US); David Richard Marquardt, Round Rock, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,567

(22) Filed: Jan. 6, 2000

(51) Int. Cl.[7] .............................................. G06F 15/16
(52) U.S. Cl. ...................... 709/219; 709/224; 709/233; 370/231; 370/236
(58) Field of Search .............................. 709/232, 233, 709/224, 248; 370/231, 235–236

(56) References Cited

U.S. PATENT DOCUMENTS

| | | | | |
|---|---|---|---|---|
| 5,528,605 A | * | 6/1996 | Ywoskus et al. | 714/749 |
| 5,701,292 A | * | 12/1997 | Chiussi et al. | 370/232 |
| 5,719,854 A | * | 2/1998 | Choudhury et al. | 370/231 |
| 5,768,508 A | * | 6/1998 | Eikeland | 709/202 |
| 5,815,667 A | * | 9/1998 | Chien et al. | 709/232 |
| 5,862,337 A | * | 1/1999 | Gray | 709/224 |
| 5,892,754 A | * | 4/1999 | Kompella et al. | 370/236 |
| 6,038,216 A | * | 3/2000 | Packer | 370/231 |
| 6,052,737 A | * | 4/2000 | Bitton et al. | 709/248 |
| 6,317,789 B1 | * | 11/2001 | Rakavy et al. | 709/224 |
| 6,459,682 B1 | * | 10/2002 | Ellesson et al. | 370/235 |

* cited by examiner

*Primary Examiner*—Wen Tai Lin
(74) *Attorney, Agent, or Firm*—Duke W. Yee; Volel Emile; Patrick C. R. Holmes

(57) ABSTRACT

A method and apparatus in a data processing system for managing receipt of data by a browser through a communications interface. Responsive to a user input, a first rate at which data is received is reduced at the browser to a decreased rate. A determination is then made as to whether incoming data for the communications interface is being received at a rate less than a threshold. Responsive to a determination that incoming data for the communications interface is being received at a rate less than the threshold, the first rate at which data is at the browser is restored.

33 Claims, 4 Drawing Sheets

FIG. 4
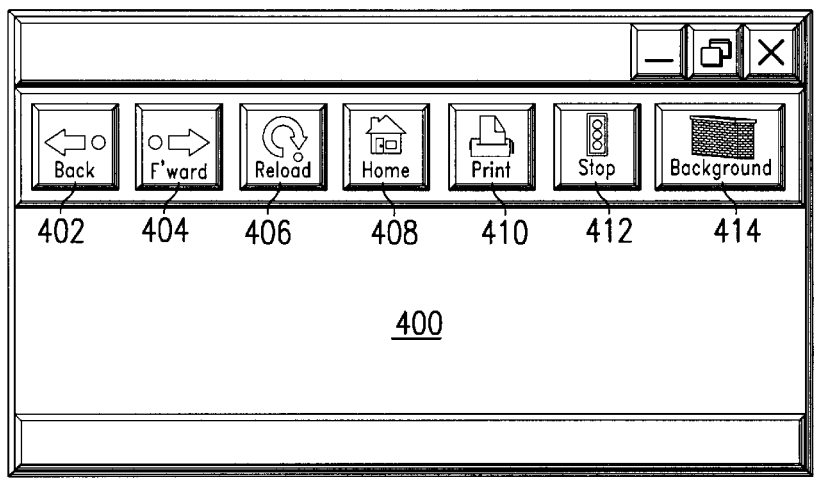
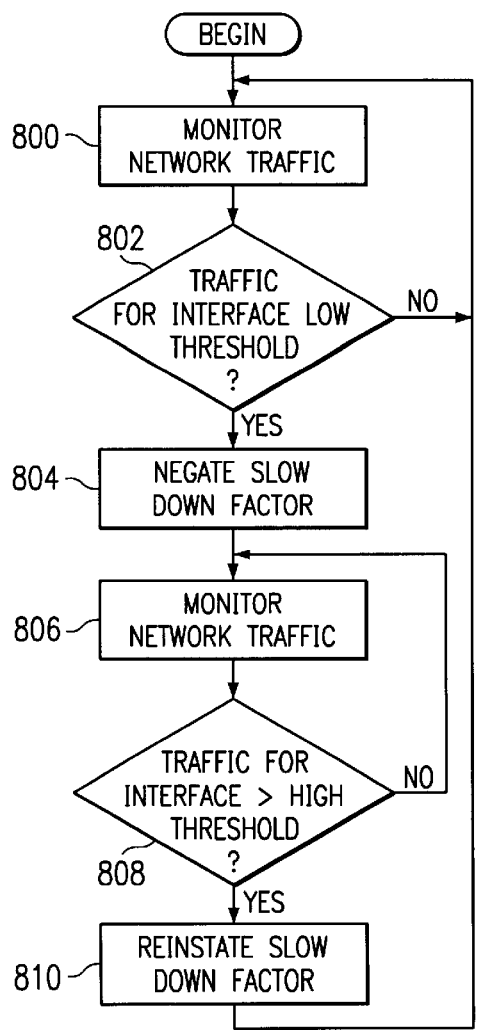
FIG. 8
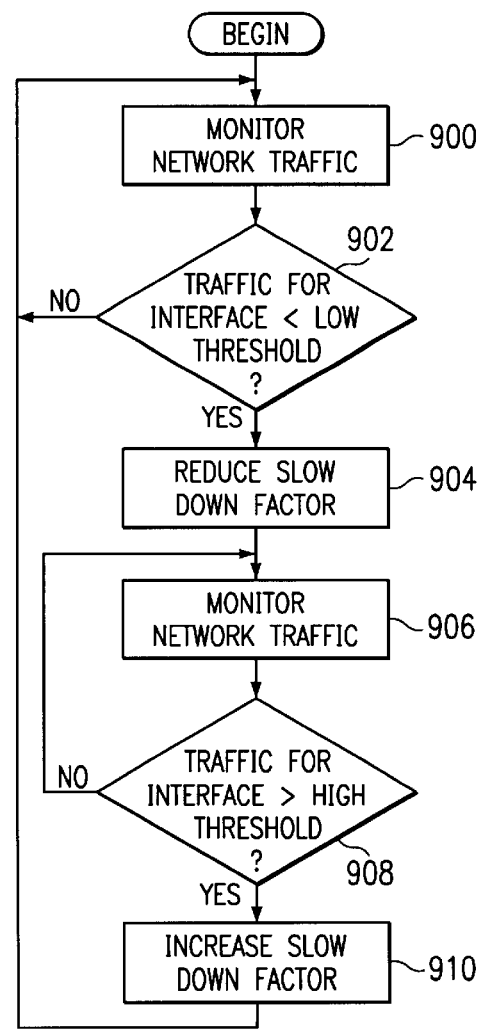
FIG. 9

METHOD AND APPARATUS FOR MONITORING AND ADJUSTING BANDWIDTH USAGE IN A BROWSER

CROSS REFERENCE TO RELATED APPLICATIONS

The present invention is related to application entitled METHOD AND APPARATUS FOR BALANCING BANDWIDTH USAGE IN A BROWSER, Ser. No. 09/478,310, filed even date hereof, assigned to the same assignee, and incorporated herein by reference.

BACKGROUND OF THE INVENTION

1. Technical Field

The present invention relates generally to an improved data processing system and in particular to a method and apparatus for managing data transfer in a data processing system. Still more particularly, the present invention relates to a method and apparatus for managing data transfer in a browser program.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Depending on the type of connection, downloading images using a web browser often may be a slow process. This situation is especially true when the interface used to obtain information is a modem. Often times, while an image is being downloaded, the user may open another browser window to view other less data intensive sites. The new browser window is another instance of the browser and may be equally slow because the bandwidth of the network interface, the modem, is being consumed by the downloading of the image. As a result, both browsers are useless or slow until the image has been downloaded. Such a situation is often frustrating for users.

Therefore, it would be advantageous to have an improved method and apparatus for downloading images.

SUMMARY OF THE INVENTION

The present invention provides a method and apparatus in a data processing system for managing receipt of data by a browser through a communications interface. Responsive to a user input, a first rate at which data is received is reduced at the browser to a decreased rate. A determination is then made as to whether incoming data for the communications interface is being received at a rate less than a threshold. Responsive to a determination that incoming data for the communications interface is being received at a rate less than the threshold, the first rate at which data is at the browser is restored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an illustration of a browser window depicted in accordance with a preferred embodiment of the present invention;

FIG. 8 is a flowchart of a process for monitoring network traffic depicted in accordance with a preferred embodiment of the present invention; and FIG. 9 is a flowchart of a process for monitoring network traffic depicted in accordance with a preferred embodiment of the present invention.

DETAILED DESCRIPTION OF THE PREFERRED EMBODIMENT

Figure 1:
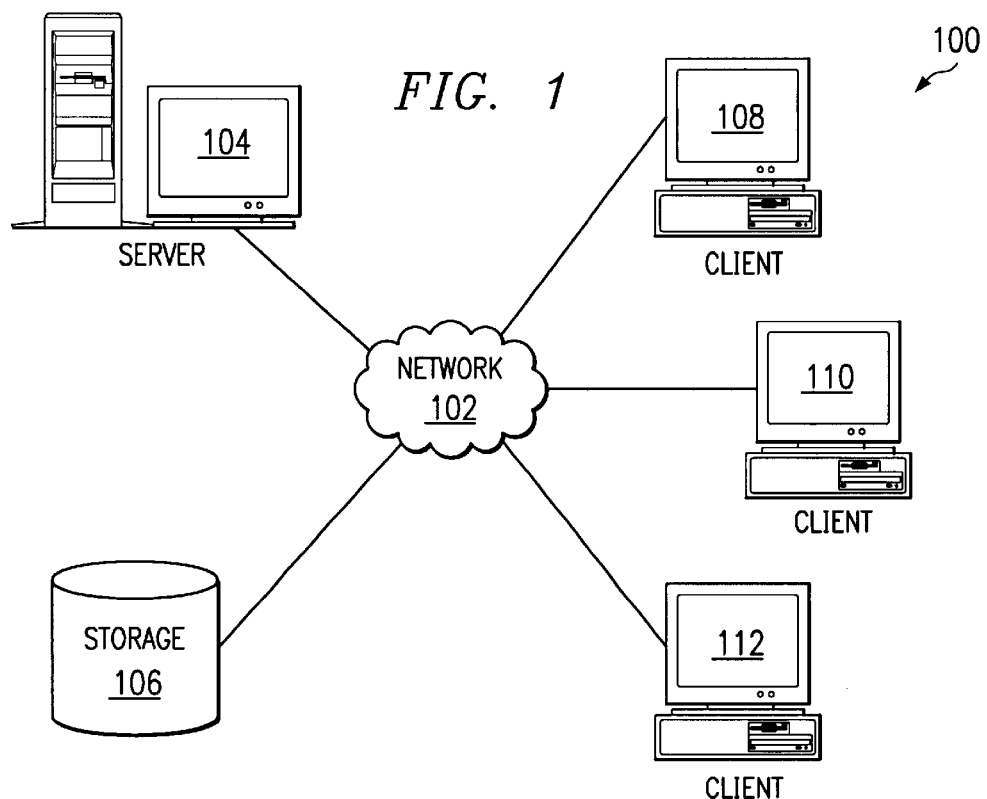
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
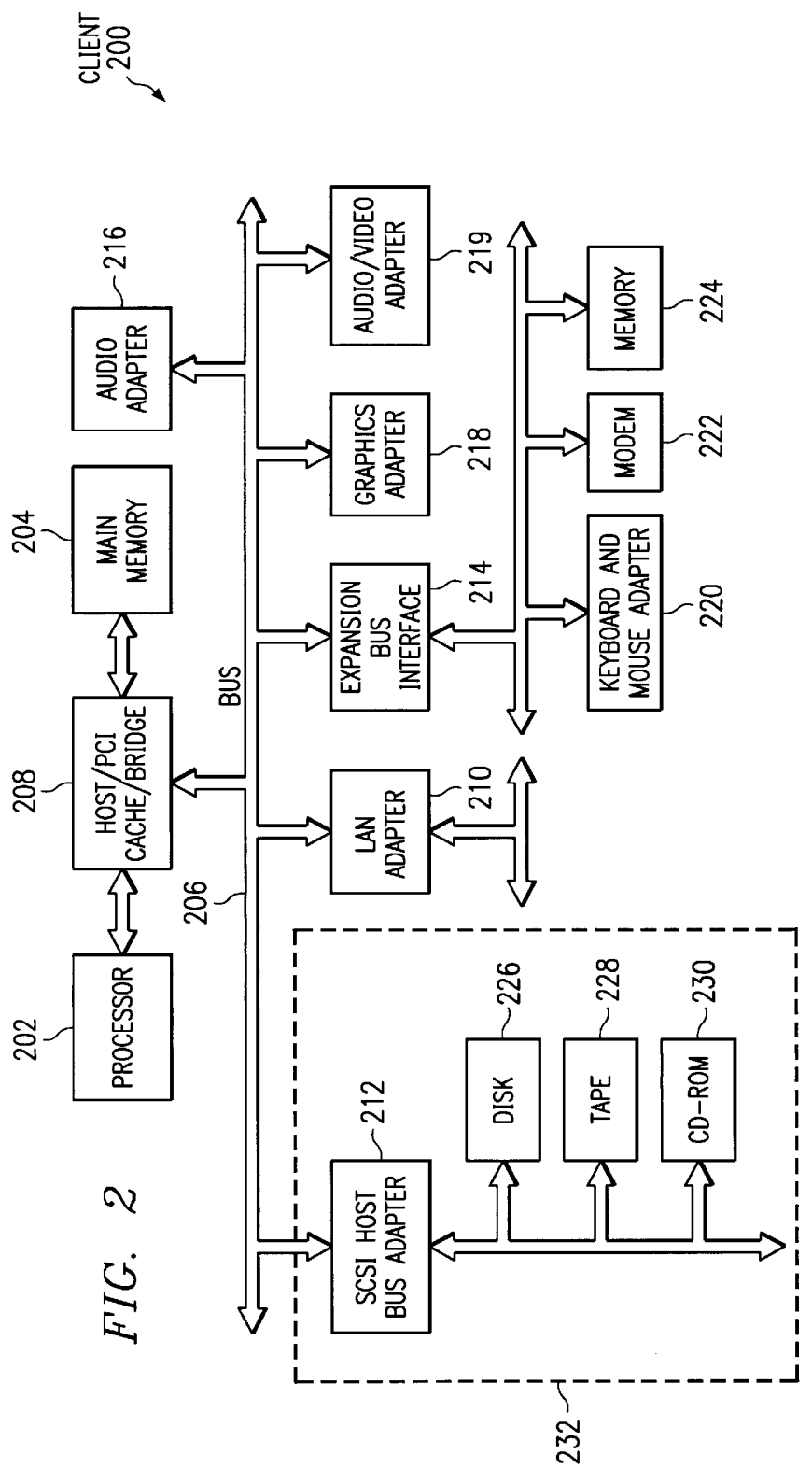
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
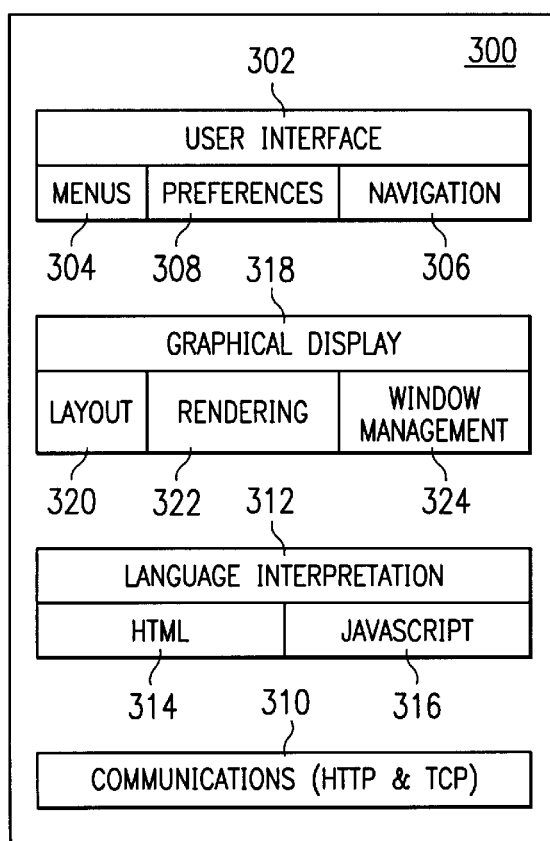
FIG. 3 is a block diagram of a browser program depicted in accordance with a preferred embodiment of the present invention.

Turning next to FIG. 3, a block diagram of a browser program is depicted in accordance with a preferred embodiment of the present invention. A browser is an application used to navigate or view information or data in a distributed database, such as the Internet or the World Wide Web.

In this example, browser 300 includes a user interface 302, which is a graphical user interface (GUI) that allows the user to interface or communicate with browser 300. This interface provides for selection of various functions through menus 304 and allows for navigation through navigation

306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communication 310 uses HTTP and TCP. TCP is a communications protocol that provides transport functions to insure that the total amount of bytes sent is received correctly at the other end. As a result, acknowledgments to the sending of packets are sent in response. Other protocols may be used depending on the implementation.

Documents that are received by browser 300 are processed by language interpretation 312, which includes an HTML unit 314 and a JavaScript unit 316. Language interpretation 312 will process a document for presentation on graphical display 318. In particular, HTML statements are processed by HTML unit 314 for presentation while JavaScript statements are processed by JavaScript unit 316.

Graphical display 318 includes layout unit 320, rendering unit 322, and window management 324. These units are involved in presenting web pages to a user based on results from language interpretation 312.

Browser 300 is presented as an example of a browser program in which the present invention may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 make be implemented using known browser applications, such Netscape Navigator or Microsoft Internet Explorer. Netscape Navigator is available from Netscape Communications Corporation while Microsoft Internet Explorer is available from Microsoft Corporation.

The present invention provides a method, apparatus, and instructions for allowing data transfer for a particular connection to continue, but at a reduced speed that does not consume all of the bandwidth available through a particular network interface. In this manner, the present invention allows another window to be open to operate and use the available bandwidth remaining unconsumed by the initial connection. The priority to lowering of a browser window may be accomplished by telling the interface layer of a protocol stack for a given connection/socket to slow down the acknowledgment responses on this particular connection/socket. In the depicted examples, the interface layer is the TCP layer. The remote server will wait to send another data packet or set of data packets until it receives an acknowledgment for the previous transmissions within a given window size of data. The server would send the data for this given connection at a slower rate in response to the slower acknowledgment responses. As a result, some of the bandwidth for the network interface is freed for use by other browser windows. Bandwidth as used herein is the transmission capability of a line such as in a communications network. This capability is typically expressed as bits per second, bytes per second, or in Hertz (cycles per second).

With reference now to FIG. 4, an illustration of a browser window is depicted in accordance with a preferred embodiment of the present invention. Browser window 400 includes a number of function buttons. In this example, browser window 400 includes a back button 402, a forward button 404, a reload button 406, a home button 408, a print button 410, a stop button 412, and a background button 414. Back button 402 allows a user to return to a previous page, while forward button 404 allows a user to move forward to another page. Reload button 406 allows reloading of a page, while home button 408 loads a home page for the browser. Print button 410 allows printing actions to occur upon pages being displayed within browser window 400. Stop button 412 stops various operations, such as the loading or reloading of pages.

Background button 414 is a new button used to balance or allocate bandwidth for a network interface device. In particular, background button 414 is used to initiate slowing of acknowledgments of the receipt of data packets by the TCP layer in these examples. Selection of background button 414 will cause the page or image being downloaded by web browser window 400 to be slowed down to allow bandwidth in the network interface to be used by other applications or browser windows. Selection of background button 414 a second time would resume the speed in downloading of a page or image.

The factor by which the acknowledgment of data packets is slowed down may be tracked in tables associated with particular devices.

Figure 5:
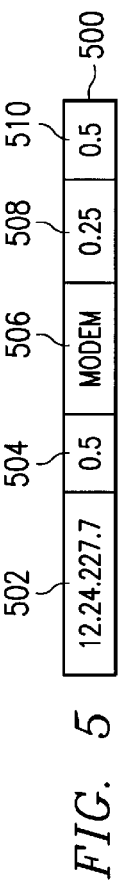
FIG. 5 is an example of an entry in a table for use in managing bandwidth in a network interface depicted in accordance with a preferred embodiment of the present invention.

With reference now to FIG. 5, an example of an entry in a table for use in managing bandwidth in a network interface is depicted in accordance with a preferred embodiment of the present invention. Entry 500 includes a connection field 502, a slow down factor field 504, an interface field 506, a low threshold field 508, and a high threshold field 510. In this example, connection field 502 contains an IP address: 12.24.227.7. The connection field in these examples are illustrated with single IP address, but in many cases more information other than the IP address is used because it is possible to have mulitple connections between the client and a host. With multiple connections to a host, a user may desire to selected only one of the connections for background downloading. Other connection specific information may be used to distinguish multiple connections to the same host.

Slow down factor field 504 in this example is 0.5. The slow down factor is a number from zero to one in these examples. With zero being no slow down and one being no acknowledgments being returned. Of course, other scales may be used depending on the implementation. Interface field 506 is used to identify the type of network interface. In this example, the network interface is an analog modem. Examples of other types of network interfaces include, for example, an ethernet adapter or a cable modem. Low threshold field 508 and high threshold field 510. In the depicted example, a low threshold of 0.25 and a high threshold of 0.5 are used.

Figure 6:
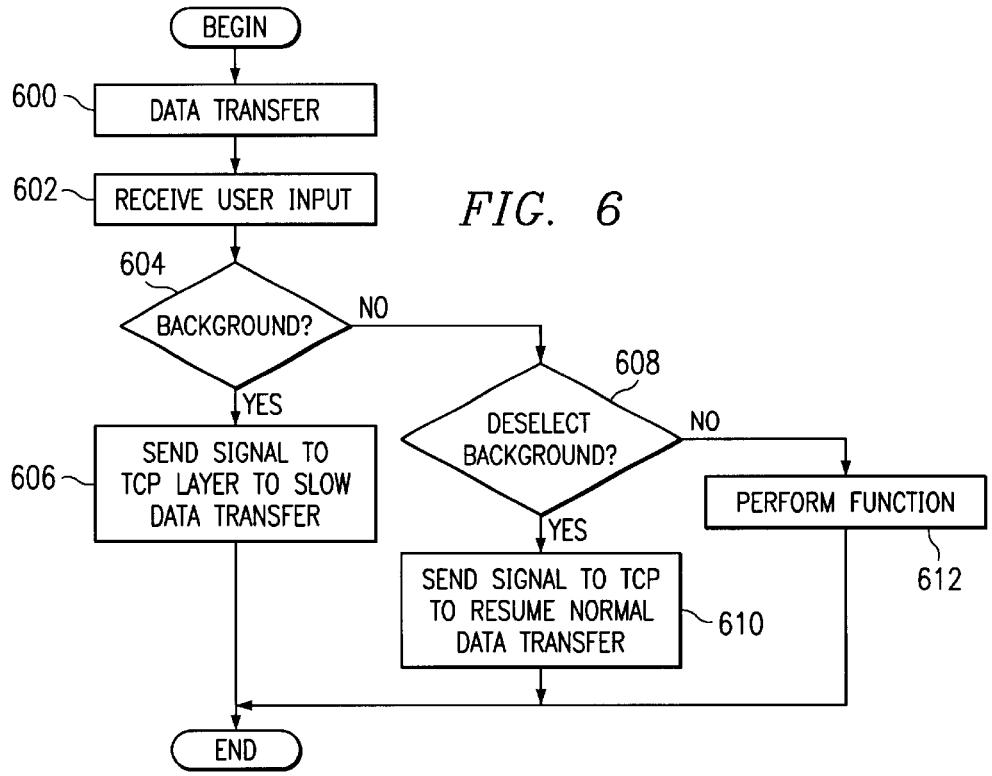
FIG. 6 is a flowchart of a process for slowing down a data transfer using a web browser depicted in accordance with a preferred embodiment of the present invention.

With reference now to FIG. 6, a flowchart of a process for slowing down a data transfer using a web browser is depicted in accordance with a preferred embodiment of the present invention. The process in FIG. 6 may be implemented in a web browser to send signals to a TCP layer to alter the speed at which data is downloaded. The process begins with a data transfer occurring (step 600). Thereafter, a user input is received through the graphical user interface for the web browser (step 602). A determination is made as to whether the input is the selection of a background function (step 604). If the input is the selection of a background function, then a signal is sent by the web browser to the TCP layer to slow down the data transfer (step 606) with the process terminating thereafter. With reference again to step 604, if the user input is not the selection of a background function, then a determination is made as to whether the input is a deselection of the background function (step 608). Deselection of a background function is possible if the user has already selected the background function previously. If the user input is the deselection of a background function, then a signal is sent to the TCP layer to resume normal data transfer rates for this particular connection (step 610), with the process terminating thereafter.

With reference again to step 608, if the user input does not deselect the background function, then the selected function is performed (step 612) with the process terminating thereafter. These functions include, for example, forward, backward, and print.

Figure 7:
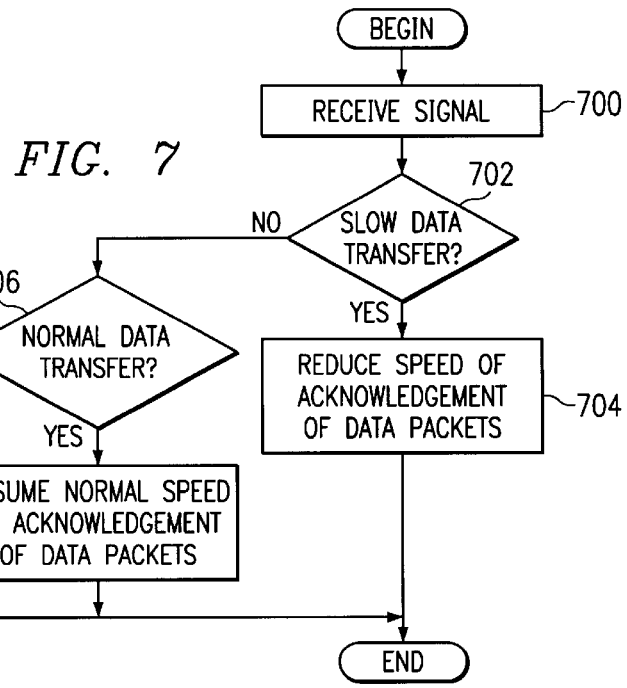
FIG. 7 is a flowchart of a process for changing a speed at which data packets are acknowledged depicted in accordance with a preferred embodiment of the present invention.

With reference now to FIG. 7, a flowchart of a process for changing a speed at which data packets are acknowledged is depicted in accordance with a preferred embodiment of the present invention. The process begins by receiving a signal from the user interface of the web browser (step 700). A determination is made as to whether the signal is to slow down the data transfer (step 702). If the signal is to slow down the data transfer, then the speed of acknowledgment of data packets is reduced (step 704) with the process terminating thereafter. The speed at which acknowledgment of data packets are reduced is performed by setting a delay, after which the acknowledgment of a data packet or set of data packets occurs. This delay may be variable and may be set depending on the desired bandwidth to be freed up or depending on the type of network interface device.

With reference again to step 702, if the signal is not one to slow down the data transfer, then a determination is made as to whether the signal is signaling that normal data transfer should occur (step 706). If the signal indicates that normal data transfer should occur, then the normal speed of acknowledgment of data packets is set in the TCP layer (step 708) with the process terminating thereafter.

With reference again to step 706, if the signal is not for a normal data transfer, then the signal is in this example one to alter the data transfer by some factor. In response to such a case, the data transfer is altered as indicated in the signal (step 710) with the process terminating thereafter. The altering of the data transfer may be faster or slower depending on the indication in the signal. This amount may vary depending on the particular implementation.

With reference now to FIG. 8, a flowchart of a process for monitoring network traffic is depicted in accordance with a preferred embodiment of the present invention. This process in these examples is initiated when a user has selected a background function. This process is used as a "throttle" process to monitor the traffic at the interface layer, such as the TCP layer. When a connection is manually slowed by the user, it is registered with the throttle process. This throttle process running at the interface layer is low enough in the network stack to determine if the freed bandwidth is actually being consumed. If the freed bandwidth is not being consumed, the throttle process will remove the retarding flag or change the amount of retarding from the connection, allowing the connection and data transfer to operate at a higher or maximum speed depending on the implementation.

Typically, the user manually selects the background button on the web browser in which data transfer is occurring. In response, the TCP acknowledge responses for this particular connection are retarded or slowed, freeing network bandwidth for other browser instances and connections. This slowing in these examples is for the duration of the connection or data transfer.

The process begins by monitoring network traffic (step 800). A determination is made as to whether the traffic for the select interface registered with this process is less than a low threshold (step 802). If the traffic for the interface is less than the low threshold, then the slow down factor is negated (step 804). Thereafter, network traffic is monitored (step 806). A determination is then made as to whether the traffic on the interface is greater than the high threshold (step 808). If the traffic is greater than the high threshold, then the slow down factor is reinstated (step 810) with the process then returning to step 800.

With reference again to step 808, if the traffic on the interface is not greater than the high threshold, then the process returns to step 806 to continue to monitor traffic. With reference again to step 802, if the traffic for the interface is not less than a low threshold, then the process returns to step 800, as described above.

With reference now to FIG. 9, a flowchart of a process for monitoring network traffic is depicted in accordance with a preferred embodiment of the present invention. This process is used to adjust the speed at which the data transfer occurs for a particular connection based on the available bandwidth. The process begins by monitoring network traffic (step 900). Next, a determination is made as to whether the traffic for the interface is less in a low threshold (step 902). If the traffic for the interface is not less than a low threshold, the process returns to step 900. Otherwise, the slow down factor is adjusted to reduce the amount of slow down (step 904).

Thereafter, the network traffic is monitored for the particular connection (step 906). A determination is made as to whether the network traffic for the particular interface is greater than a high threshold (step 908). If the traffic on the interface is greater than a high threshold, the slow down factor is increased for the particular interface (step 910) with the process then returning to step 900. Otherwise, the process returns to step 906 to monitor traffic for the interface.

Thus, the present invention provides an improved method, apparatus, and instructions for allowing a user to adjust the bandwidth that a particular instance of a web browser uses in downloading data. This allows a user to start another instance of a web browser and download data that is quicker to download and view that data while the web browser instance in which the function has been activated downloads at a slower rate. In this manner, a user may allocate bandwidth to different instances of a web browser.

Further, the present invention also provides a mechanism in which the bandwidth allocation initiated by the user for a background type downloading of data may be monitored to see if all of the bandwidth for the interface is being used. If all of the bandwidth is not being used, then the speed at which data is downloaded for the particular connection may be increased to use unused bandwidth. The changes in bandwidth usage also may be made in response to programs being moved from a foreground mode to a backgroung mode. Programs moved to a background mode will require less bandwidth from the communications interface and as a result, the rate at which data is recevied will be reduced to make bandwidth available for programs operating in a foreground mode. Moving a program to a fore ground mode will cause the bandwidth allocated to the program to be increased, using more bandwidth relative to other programs.

Thus, if the speed at which data is being transferred through the interface is greater than some threshold, the speed at which data transfer occurs for this connection may be slowed down to allocate bandwidth for use by other instances of a web browser or by other applications needing bandwidth from the particular interface.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed many modifications and variations will be apparent to these of ordinary skill in the art. For example, although the depicted embodiment illustrates the slowing down of the reception of data for a connection being used by an instance of a browser by delaying the acknowledgment of data packets, other mechanisms may be used depending on the particular implementation. Also, the processes may be applied to other programs accessing a communictions interface other than a broswer. Additionally, although two thresholds are illustrated, other numbers of thresholds may be used to determine when the slow down factor is to be used, ignored, increased, or decreased Further, the amount of increase or decrease may differ depending on the type of interface or on the threshold. Additionally, a user may select the background button again to further reduce the rate at which data is downloaded in the instance of the browser to provide additional granularity. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for managing receipt of data, the method comprising the data processing system implemented steps of:
    responsive to a user input, reducing a first rate at which data is received at a first browser instance to a decreased non-zero rate greater than a threshold;
    determining whether incoming data at the first browser instance is being received at a rate less than the threshold; and
    responsive to a determination that the incoming data at the first browser instance is being received at a rate less than the threshold, restoring the first rate at which data is received at the first browser instance.

2. The method of claim 1, wherein the threshold is a first threshold and further comprising:
    responsive to restoring the first rate, determining whether the incoming data for the interface is being received at a rate greater than a second threshold; and
    responsive to a determination that the incoming data is greater than a second threshold, reducing the first rate to the decreased rate.

3. The method of claim 1, wherein the first rate is reduced to the decreased rate by introducing a delay in acknowledging receipt of the data.

4. The method of claim 1, wherein the program is a browser, and wherein the browser is a first instance of a browser and wherein a second instance of the browser is receiving data and incoming data for the interface is being received at a rate determined by data received for the first instance of the browser and for the second instance of the browser.

5. A method in a data processing system for managing receipt of data in a first download by a program through a communications interface, the method comprising the data processing system implemented steps of:
    responsive to a user input, reducing a rate at which data of the first download is received by the program, wherein bandwidth for the communications interface is made available; and
    responsive to a determination that unused bandwidth for the communications interface is present after the user input, increasing the rate at which data of the first download is received by the program.

6. The method of claim 5, wherein the user input places the program in a background mode.

7. The method of claim 5, wherein the user input is an opening of a program requiring bandwidth from the communications interface.

8. The method of claim 5, further comprising:
    determining whether available bandwidth for the communications interface is sufficient; and
    responsive to a determination that the available bandwidth is insufficient, further reducing the rate at which data is received by the program.

9. The method of claim 5, wherein the program is a browser.

10. A method in a data processing system for managing receipt of data of a first download by a program through a communications interface, the method comprising the data processing system implemented steps of:
    receiving data of the first download at the program through the communications interface at a selected rate;
    determining whether incoming data of the first download for the interface is being received at a rate greater than a threshold; and
    responsive to a determination that the selected rate is greater than the threshold, decreasing the selected rate at which data of the first download is received at the program.

11. The method of claim 10, wherein the threshold is a first threshold and further comprising:
    determining whether incoming data for the interface is being received at a rate greater than a second threshold; and
    responsive to a determination that the selected rate is greater than the second threshold, increasing the selected rate.

12. The method of claim 11, wherein the first threshold is equal the second threshold.

13. The method of claim 10, wherein the interface is a modem.

14. The method of claim 10, wherein the interface is a ethernet adapter.

15. The method of claim 10, wherein the program is a browser.

16. A data processing system for managing receipt of data, the data processing system comprising:

reducing means, responsive to a user input, for reducing a first rate at which data is received at a first browser instance to a decreased non-zero rate greater than a threshold;

determining means for determining whether incoming data at the first browser instance is being received at a rate less than the threshold; and restoring means, responsive to a determination that incoming data at the first browser instance is being received at a rate less than the threshold, restoring the first rate at which data is received at the first browser instance.

17. The data processing system of claim 16, wherein the determining means is a first determining means and wherein the threshold is a first threshold and further comprising:

second determining means, responsive to restoring the first rate, for determining whether the incoming data for the interface is being received at a rate greater than a second threshold; and reducing means, responsive to a determination that the incoming data is greater than a second threshold, for reducing the rate to the decreased rate.

18. The data processing system of claim 16, wherein the rate is reduced to the decreased rate by introducing a delay in acknowledging receipt of the data.

19. The data processing system of claim 16, wherein the program is a browser, and wherein the browser is a first instance of a browser and wherein a second instance of the browser is receiving data and incoming data for the interface is being received at a rate determined by data received for the first instance of the browser and for the second instance of the browser.

20. A data processing system for managing receipt of data in a first download by a program through a communications interface, the data processing system comprising:

reducing means, responsive to a user input, for reducing a rate at which data of the first download is received by the program, wherein bandwidth for the communications interface is made available; and increasing means, responsive to a determination that unused bandwidth for the communications interface is present after the user input, for increasing the rate at which data of the first download is received by the program.

21. The data processing system of claim 20, wherein the user input places the program in a background mode.

22. The data processing system of claim 20, wherein the user input is an opening of a program requiring bandwidth from the communications interface.

23. The data processing system of claim 20, further comprising:

determining means for determining whether available bandwidth for the communications interface is sufficient; and reducing means, responsive to a determination that the available bandwidth is insufficient, for further reducing the rate at which data is received by the program.

24. The data processing system of claim 20, wherein the program is a browser.

25. A data processing system for managing receipt of data of a first download by a program through a communications interface, the data processing system comprising:

receiving means for receiving data of the first download at the program through the communications interface at a selected rate;

determining means for determining whether incoming data of the first download for the interface is being received at a rate greater than a threshold; and decreasing means, responsive to a determination that the selected rate is greater than the threshold, for decreasing the selected rate at which data of the first download is received at the program.

26. The data processing system of claim 25, wherein the threshold is a first threshold and further comprising:

determining means for determining whether incoming data for the interface is being received at a rate greater than a second threshold; and increasing means, responsive to a determination that the selected rate is greater than the second threshold, for increasing the selected rate.

27. The data processing system of claim 26, wherein the first threshold is equal the second threshold.

28. The data processing system of claim 25, wherein the interface is a modem.

29. The data processing system of claim 25, wherein the interface is a ethernet adapter.

30. The data processing system of claim 25, wherein the program is a browser.

31. A computer program product in a computer readable medium for managing receipt of data, the computer program product comprising:

first instructions, responsive to a user input, for reducing a first rate at which data is received at a first browser instance to a decreased non-zero rate greater than a threshold;

second instructions for determining whether incoming data at the first browser instance is being received at a rate less than the threshold; and third instructions, responsive to a determination that incoming data at the first browser instance is being received at a rate less than the threshold, restoring the first rate at which data is received at the first browser instance.

32. A computer program product in a computer readable medium for managing receipt of data of a first download by a program through a communications interface, the computer program product comprising:

first instructions, responsive to a user input, for reducing a rate at which data of the first download is received by the program, wherein bandwidth for the communications interface is made available; and second instructions, responsive to a determination that unused bandwidth for the communications interface is present after the user input, for increasing the rate at which data of the first download is received by the program.

33. A computer program product in a computer readable medium for managing receipt of data of a first download by a program through a communications interface, the computer program product comprising:

first instructions for receiving data of the first download at the program through the communications interface at a selected rate;

second instructions for determining whether incoming data of the first download for the interface is being received at a rate greater than a threshold; and third instructions, responsive to a determination that the selected rate is greater than the threshold, for decreasing the selected rate at which data of the first download is received at the program.

* * * * *